(12) United States Patent
Elangovan et al.

(10) Patent No.: US 11,624,214 B2
(45) Date of Patent: Apr. 11, 2023

(54) TIME OF FLIGHT BASED SECURITY FOR MULTIPLE KEY FOBS

(71) Applicant: Ford Global Technologies, LLC, Dearborn, MI (US)

(72) Inventors: Vivekanandh Elangovan, Canton, MI (US); Michael Hrecznyj, Livonia, MI (US); John Robert Van Wiemeersch, Novi, MI (US); Ryan Edwin Hanson, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 330 days.

(21) Appl. No.: 16/784,185

(22) Filed: Feb. 6, 2020

(65) Prior Publication Data

US 2021/0246693 A1    Aug. 12, 2021

(51) Int. Cl.
*E05B 77/44*    (2014.01)
*G06F 21/44*    (2013.01)
*B60R 25/10*    (2013.01)

(52) U.S. Cl.
CPC .............. *E05B 77/44* (2013.01); *B60R 25/10* (2013.01); *G06F 21/44* (2013.01); *B60R 2325/101* (2013.01); *G06F 2221/2111* (2013.01)

(58) Field of Classification Search
CPC ... E05B 77/44; B60R 25/10; B60R 2325/101; G06F 21/44; G06F 2221/2111
See application file for complete search history.

(56) References Cited

U.S. PATENT DOCUMENTS

| | | |
|---|---|---|
| 2018/0007078 A1 | 1/2018 | Motos et al. |
| 2018/0103414 A1 | 4/2018 | Golsch |
| 2019/0272690 A1* | 9/2019 | Kaye .................. G07C 9/00571 |
| 2019/0308612 A1* | 10/2019 | Lavoie ................. G05D 1/0016 |
| 2019/0363746 A1* | 11/2019 | Zalewski ........... G06Q 30/0635 |
| 2020/0120509 A1* | 4/2020 | Stitt ........................ H01Q 13/10 |
| 2020/0254968 A1* | 8/2020 | Hassani .................. B60R 25/24 |

FOREIGN PATENT DOCUMENTS

| | | |
|---|---|---|
| CN | 109655817 A | 4/2019 |
| WO | 2005114593 A1 | 12/2005 |

* cited by examiner

*Primary Examiner* — Nabil H Syed
(74) *Attorney, Agent, or Firm* — Frank Lollo; Eversheds Sutherland (US) LLP

(57) ABSTRACT

A system for passive locking and unlocking a vehicle is described that includes a memory for storing executable instructions and a processor configured to execute the instructions to unlock the vehicle using a time of flight to transmit the trigger request between the vehicle and the first key fob. The processor receives, from a first key fob, a trigger request to unlock the vehicle, and determines, based key fob identifiers that identify the first key fob and a second key fob that is also near the vehicle, that the first and second key fobs are associated with a vehicle. The processor selects the first key fob based on a key fob characteristic. The processor evaluates the time of flight using the first key fob, and unlocks the vehicle based on the time of flight satisfying a threshold for signal transmission flight time.

20 Claims, 6 Drawing Sheets

TIME OF FLIGHT BASED SECURITY FOR MULTIPLE KEY FOBS

TECHNICAL FIELD

The present disclosure relates to security systems for passive entry passive start key fobs.

BACKGROUND

Relay attacks on Passive Entry and Passive Start (PEPS) key systems are a growing concern among automotive OEMs. Relay attacks can include amplification and relay of a radio frequency (RF) signal from a key fob using equipment that attempts to mimic the signal of a valid key fob operating within an expected close proximity to the vehicle. Since some PEPS key systems may use signal strength to determine a distance between the key and the vehicle, a relay attack can make it appear that the key fob is near the vehicle or inside the vehicle when this is not the case.

A system that is resilient to relay attack to a PEPS communication system is disclosed in U.S. Patent Pub. No. 2018/0007078, assigned to Texas Instruments Inc. (hereafter "the '078 Publication"). The '078 Publication discloses a method of resisting relay-attack by sending a synchronization signal from a master device to a slave wireless device, where the switching between the transmit and receive roles of the key fob and the vehicle's digital radio device are interlocked to one another to be time bounded, in an effort to prevent relay attacks by reducing the time uncertainty. While the system described in the '078 Publication may reduce time uncertainty, the '078 Publication may not provide support for multiple key fobs that are simultaneously present near the vehicle without cumulative delays in unlocking the vehicle.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
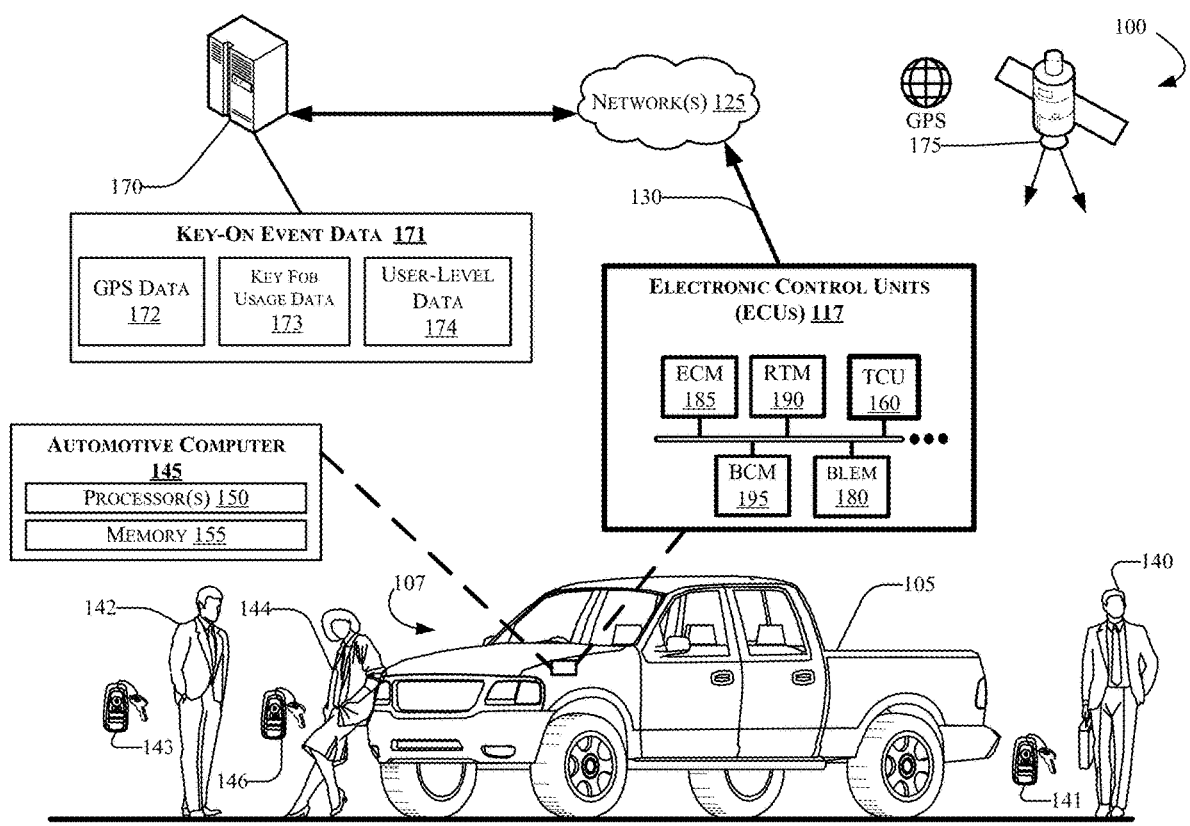
FIG. 1 depicts an example networking environment in which techniques and structures for providing the systems and methods disclosed herein may be implemented.

The systems and methods disclosed herein are configured to provide passive entry passive start (PEPS) systems to a vehicle by communicating with multiple key fobs associated with a vehicle that are all co-located in an operative distance to the particular vehicle to implement a Time-of-Flight (ToF) security system. Each key fob associated with a vehicle within proximate operating distances of the vehicle is assigned a time slot and assigned a communication time for RF signal advertisement, for example 10 msec. A Body Control Module (BCM), which in one embodiment may be or include a radio transceiver module (RTM), or in another embodiment may be a Bluetooth® Low Energy module (BLEM), then decides which key fob to use when executing the ToF determination. For purposes of this disclosure, a key fob may refer to any mobile device, including a mobile phones and wearable, configured to operate as a key fob.

In some embodiments of the present disclosure, the BCM may receive a trigger request, such as, for example, a touch to a door handle. Responsive to the door handle touch, the BCM may transmit a low frequency (LF) challenge message to all key fobs within an operative distance of the vehicle PEPS system. The key fobs within the operative distance may respond, each in turn, with their measurement of Received Signal Strength Indication (RSSI) according to a set time slot allocation set for each of the key fobs within operative range of the vehicle.

After receiving all responses back from key fobs within operative range, the BCM may select a key fob to use for performing a ToF determination based on various selectable criteria associated with the key fobs. Example characteristics or criteria for selection may include Bluetooth® Low-Energy (BLE) RSSI, Ultra-High Frequency (UHF) RSSI, Ultra-Wide Band (UWB) RSSI, date information and time information associated with a previous vehicle access, Low-Frequency (LF) RSSI of the key fobs, a pre-set value indicating the method for selecting the ToF-determining key fob, or selection of a ToF-determining fob using an analytical engine that uses date and time information from prior vehicle accesses to determine predictive patterns associated with the key fob use. For example, the analytical model may use an adaptive method that uses machine learning techniques to select the ToF determining key fob based on historical use patterns. The analytical model may select a key fob based on the prior use data.

The RTM (or BCM) may wait until all the messages are received from each key fob before making its determination on which key fob to use as the ToF fob. The RTM may select the key fob for performing the ToF determination, authenticate that key fob only, and, if determined to be an authenticated fob, the RTM may forward command messages to the body control module (BCM) to unlock the vehicle door(s). If the ToF performed on a specific key fob indicates a relay attack on the vehicle, the RTM will proceed to the next key fob based on the criteria listed above.

In one example embodiment, the present disclosure can be used to mitigate unauthorized access to a vehicle PEPS system by devices making a relay attack against particular key fobs. Aspects of this disclosure may provide for a system that reduces or eliminates the threat of relay attacks while keeping the system response time within tolerable delay limits that unlock vehicle doors responsive to a user trigger event command (e.g., touching a door handle) without a noticeable delay.

These and other advantages of the present disclosure are provided in greater detail herein.

Illustrative Embodiments

The disclosure will be described more fully hereinafter with reference to the accompanying drawings, in which exemplary embodiments of the disclosure are shown, and not intended to be limiting.

FIG. 1 depicts an example computing environment 100 that can include a vehicle 105 configured with an automotive computer 145, and a telematics control unit (TCU) 160 operative in the vehicle 105. The automotive computer 145 may communicate with other computing systems (e.g., one or more remote server(s) 170) and vehicle access devices via network(s) 125 using one or more wireless channel(s) 130. For example, in one possible embodiment, a user 140 is depicted with a key fob 141. The key fob 141 may be configured to allow vehicle features, such as remote starting, remote unlocking, security access, etc. Other vehicle users are depicted in FIG. 1, including users 142 and 144, who may also carry and/or use key fobs 143 and 146, respectively.

The vehicle 105 may include an automotive computer 145, which may include one or more processor(s) 150 and memory 155. The vehicle 105 may further include any number of a plurality of electronic control units (ECUs) 117, which may be disposed in communication with and/or be a part of the automotive computer 145. The ECUs 117 may, in some example embodiments, include a telematics control unit (TCU) 160 disposed in communication with a mobile device (not shown in FIG. 1), and/or one or more server(s) 170. The server(s) 170 may be associated with and/or include a Telematics Service Delivery Network (SDN) (not shown in FIG. 1). The vehicle 105 may also receive and/or be in communication with a Global Positioning System (GPS) 175.

Although illustrated as a truck, the vehicle 105 may take the form of another passenger or commercial automobile such as, for example, a car, a work vehicle, a sport utility vehicle, a crossover vehicle, a van, a minivan, a taxi, a bus, etc. Further, the vehicle 105 may be a manually driven vehicle, and/or be configured to operate in a fully autonomous (e.g., driverless) mode or partially autonomous mode. Additionally, the vehicle may use an electric powertrain or a traditional internal combustion engine.

The one or more network(s) 125 illustrate an example of one possible communication infrastructure in which the connected devices may communicate. The one or more network(s) 125 may be and/or include the Internet, a private network, public network or other configuration that operates using any one or more known communication protocols such as, for example, transmission control protocol/Internet protocol (TCP/IP), Bluetooth®, Wi-Fi based on the Institute of Electrical and Electronics Engineers (IEEE) standard 802.11, Ultra-Wide Band (UWB), and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The ECUs 117 can include communication and control access to a plurality of vehicle computing modules such as, for example, a Bluetooth® Low-Energy Module (BLEM) 180, and/or a Remote Transceiver Module (RTM) 190. In other aspects, the ECUs 117 may be disposed in communication with other vehicle control modules, such as, for example, a Body Control Module (BCM) 195, among other control modules. Control and/or communication with other control modules not shown is possible, and such control is contemplated. In some examples, the BLEM 180 may be a subset of (or part of) the RTM 190, and/or may be one of several modules collectively discussed as the RTM 190. In some aspects, the ECUs 117 may implement one or more instruction sets that control vehicle functionality such as, for example, locking, unlocking, sounding an alarm, sending a communication through the wireless channels 130, etc.

The automotive computer 145 may be installed in an engine compartment of the vehicle 105 (or elsewhere in the vehicle 105) as part of a Time-of-Flight (ToF) security control system in accordance with the disclosure. The automotive computer 145 may include, in one example, the one or more processor(s) 150, and a computer-readable memory 155. In other example embodiments, the ECUs 117 may be integrated with and/or be incorporated with the automotive computer 145. For the sake of simplicity, the computing system architecture of the automotive computer 145 may omit certain computing modules. It should be readily understood that the computing environment depicted in FIG. 1 is one example of a possible implementation according to the present disclosure, and thus, it should not to be considered limiting or exclusive.

The one or more processor(s) 150 may be disposed in communication with one or more memory devices (e.g., the memory 155 and/or one or more external databases (not shown in FIG. 1)). The one or more processor(s) 150 may utilize the memory 155 to store programs in code and/or to store data for performing aspects of the ToF evaluation, key fob authentication, and other aspects described in accordance with the disclosure. The memory 155 may be a non-transitory computer-readable memory. The processor(s) 150 may be configured to execute computer-executable instructions stored in the memory 155 for performing various functions of the ToF evaluation steps, as well as for performing vehicle control capabilities in accordance with the disclosure. Consequently, the memory 155 may be used for storing code and/or data code and/or data for performing operations in accordance with the disclosure.

The memory 155 can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.).

The memory 155 may be one example of a non-transitory computer-readable medium, and may be used to store programs in code and/or to store data for performing various operations in accordance with the disclosure. The instructions in the memory 155 can include one or more separate programs, each of which can include an ordered listing of computer-executable instructions for implementing logical functions. In another exemplary implementation, some or all components of the automotive computer 145 may be shared with the ECUs 117.

The memory 155 may store various code modules such as, for example, a secure communication controller (not shown in FIG. 1) for establishing the one or more channels 130 (which may, in some embodiments, be encrypted channel(s)) between the remote server(s) 170, the ECUs 117, and/or the automotive computer 145. In one aspect, the server(s) 170 may include PEPS system trigger event data 171 that may provide user-specific, vehicle-specific, and key fob-specific information that may be used in conjunction with signal information and other information, to provide or deny access to vehicle functionality.

The server(s) 171 may store data associated with prior vehicle access associated with key fobs, referred to as trigger (or key-on) event data 171. The trigger event data 171 may include, for example, global positioning system (GPS) data 172 indicative of present and/or past GPS coordinate information associated with vehicle 105 location, and/or key fob position associated with the key fobs 141, 143, and/or 146. The key fob usage data 173 may be indicative of historical key fob usage based on individual users, based on location indicated by the GPS data 172, based on date information and/or time information, and other aspects. The user-level data 174 may be indicative of user-specific information such as, for example, identity information, authentication information, schedule information, contact data, biometric information, and other data that may be specific to particular users of the vehicle 105 and/or the ToF security system 107.

Figure 2:
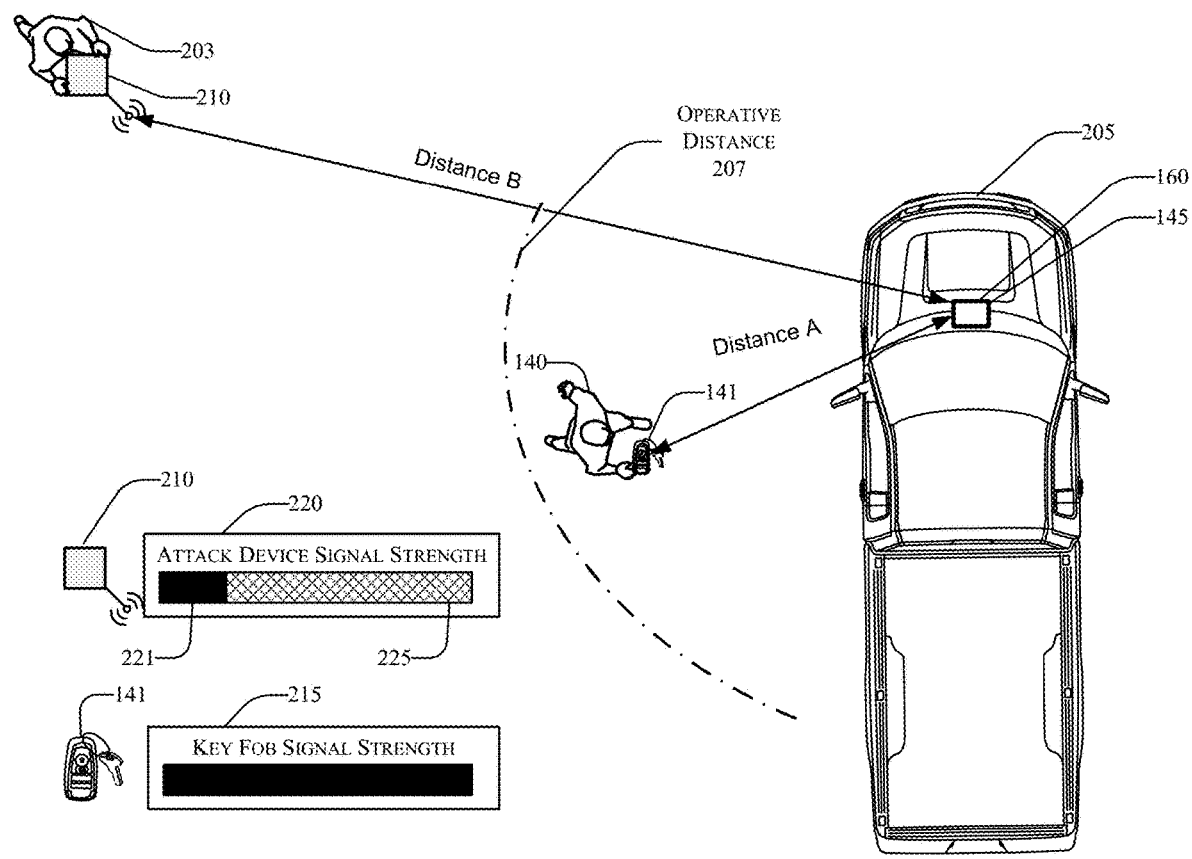
FIG. 2 depicts an example scenario depicting a relay attack device attempting to gain access to a vehicle.

Embodiments described below (e.g., with respect to FIGS. 3-7) may determine, based at least in part on the trigger event data 171, whether particular trigger requests validly originate from one of the authorized key fobs 141, 143, and/or 146, or whether the trigger request originates from a bad actor operating a relay attack device. FIG. 2 depicts an example scenario where one such bad actor, a relay attacker 203, makes an attempt to access a vehicle 205 using a relay attack device 210. In general, relay attacks to PEPS key systems can include listening for and copying key fob identification information associated with key fobs by intercepting the signal as it is sent from the key fob to the vehicle. Since PEPS key systems may rely on signal strength to determine a key fob's distance to the vehicle, spoofing the RF signal in this way can provide a signal to the vehicle that appears to originate from an authorized fob located near the vehicle. For example, a fob may be permitted access when the device is located within an operative distance 207, but denied access when outside of the operative distance 207. Accordingly, relay attack devices such as the relay attack device 210 shown in FIG. 2 may make it appear as though a signal originating from the relay attack device 210 originates from within the operative distance 207, or even from inside the vehicle 205, even when the attack signal does not originate from those areas, but instead comes from an attack device located further from the vehicle.

In one example scenario, the relay attack device 210 is depicted in FIG. 2 attempting to spoof a signal originating from the key fob 141, as the user 140 approaches the vehicle 205. The relay attack device 210 may listen for the key fob 141 signal, and perform a man-in-the-middle attack to gain unsecured access to the vehicle 205 by manipulating signal strength as an aspect of the attack.

Signal strength perceived by the key fob 141 may change based on the distance from the source of the signal (e.g., the vehicle 205), where the strength increases as the key fob approaches the vehicle's position. Stated another way, the closer together the key fob and the vehicle are, the stronger the signal strength. For example, the key fob signal strength 215 is relatively strong at Distance A, which may be within the operative distance 207 associated with the PEPS system of the vehicle 205. In comparison, the actual signal strength 221 of a signal received at the relay attack device 210 at Distance B (outside of the operative distance 207) may be relatively weak in comparison to the key fob signal strength 215, due to the respective distance from the vehicle 205. According to most lock/unlock protocols, a vehicle BCM may send a low frequency (LF) challenge message requesting the signal strength measurement received at the key fob, and the key fob may return an answer message that includes a value for the signal strength. If the relay attack device 210 were to listen for the unlock signal from the authorized key fob 141, and attempt to relay the spoofed signal back to the vehicle 205 in an attempt to fool the vehicle's control system into providing access, the attempt is not likely to succeed because the attack device signal strength 220 relayed back to the vehicle 205 would indicate that the requesting device (the relay attack device 210) is outside of the operative distance 207.

Accordingly, the relay attack device 210 may amplify and/or relay the RF signal from a relatively far distance away (Distance B) from the vehicle 205, by making the augmented signal strength 225 approximate the strength of the authentic key fob 141 as if it were within the operative distance 207 from the vehicle 205. The augmented signal strength 225 may relay the identification code sent by the key fob 141, with an amplified signal that spoofs not only the authentic code, but also the proper distance to the vehicle 205. The vehicle 205 may not be able to distinguish between the relay attack device 210 signal in the scenario described with respect to FIG. 2.

One way to head off relay attacks and prevent key fob spoofing may be to incorporate a Time of Flight (ToF) security controller that calculates a round trip time for the path between the vehicle and the key fob or other configured device such as a mobile device (e.g., the mobile device 120 depicted in FIG. 1) configured as a Phone-as-a-Key (PaaK) system, or another similar device, and determines if the device is within the normal distance for a PEPS request from an authorized vehicle user. In other aspects, other methods of ToF calculation are contemplated, such as, for example, signal phase measurement. Using a ToF determination, when a relay attack device, such as the relay attack device 210, attempts to spoof a signal by copying an encoded message and augmenting the signal strength to fool the PEPS controller, the control system may evaluate the time of flight associated with sending the message to the receiving fob, and receiving the message response back at the vehicle. Stated in another way, in a relay attack, the attack adds time in the Time of Flight calculation which equates to greater distance, and therefore the key fob is considered out of an allowable distance for a passive entry and/or passive start request.

Figure 3:
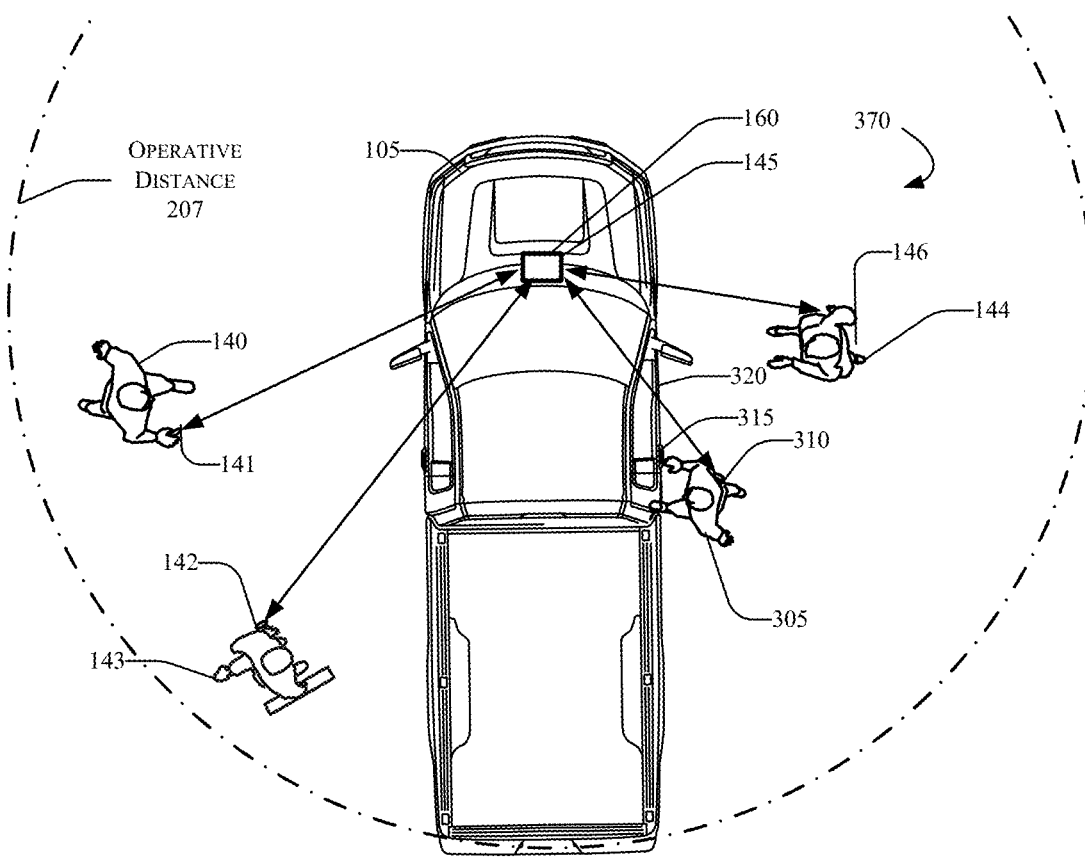
FIG. 3 depicts multiple users with valid key fobs in close proximity to a vehicle at the same time in accordance with the present disclosure.

FIG. 3 depicts multiple users with valid key fobs approaching the vehicle 105 at the same time in accordance with the present disclosure. The scenario shown in FIG. 3 may be common in situations where multiple members of a family share use of a vehicle, and they each carry a key fob associated with the vehicle 105. For example, the user 140 may carry and use the key fob 141, the user 142 may carry and use the key fob 143, the user 144 may carry and use the key fob 146, and a user 305 may carry and use a key fob 310.

Figure 4:
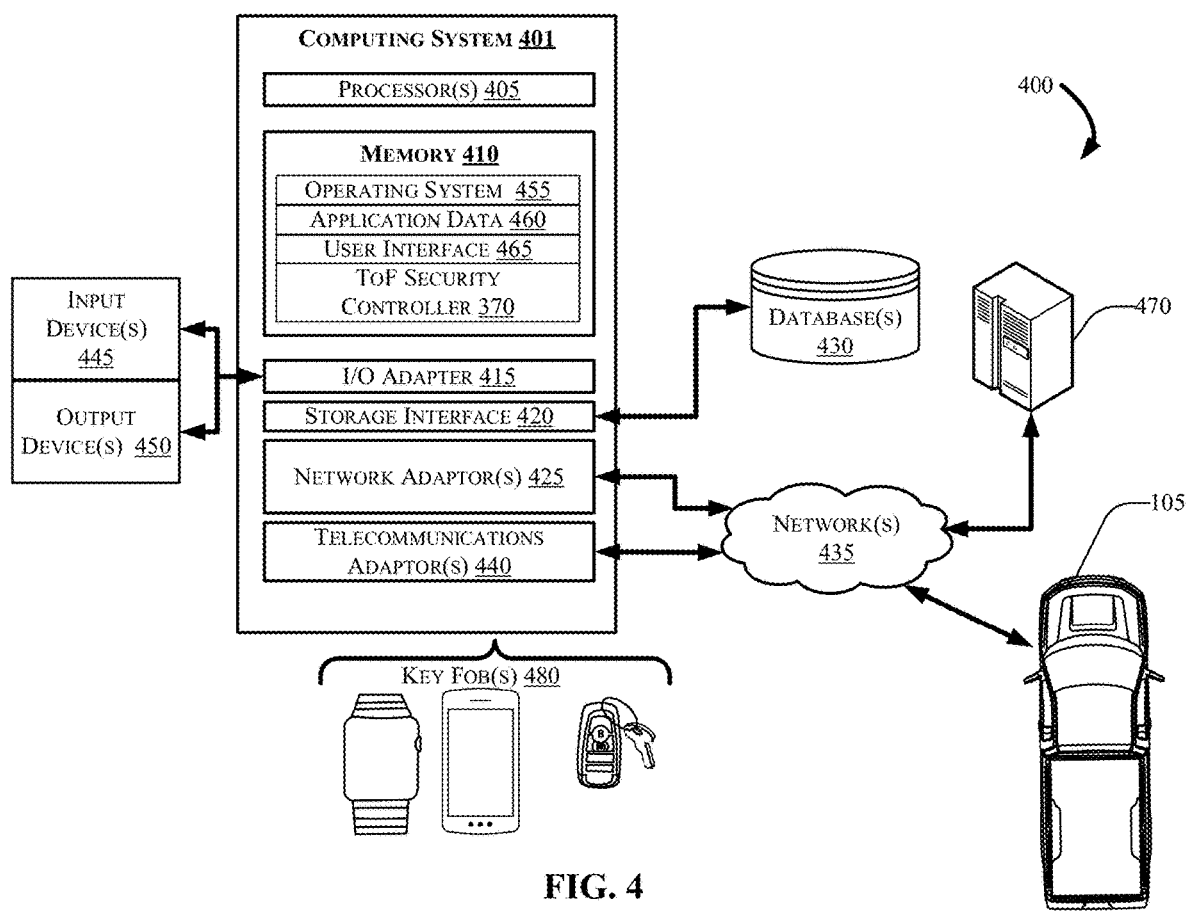
FIG. 4 illustrates a block diagram of an exemplary computing environment 400 and computer system in accordance with the present disclosure

According to an embodiment, the automotive computer 145 and the ECUs 117 may be configured with a ToF security controller (e.g., the ToF security controller 370 discussed with respect to FIG. 4). The ToF security controller 370 (hereafter ToF controller 370") may receive a trigger request, which may be, for example, a touch to a door handle (not shown in FIG. 3) of the vehicle 105, shown by a user 305 touch to the door handle 315. The door handle may trigger the automotive computer 145 and/or the ECUs 117 to transmit a low-frequency (LF) challenge message to all key fobs 141, 143, 146, and 310, within the operative distance 207 of the vehicle ToF security controller 370. In one example embodiment, an operative distance may be five meters, three meters, or some other distance.

Responsive to receiving the LF challenge message, all key fobs 141, 143, 146, and 310 may respond with a response message indicating a signal strength associated with the LF challenge message. The signal strength may inform the ToF security controller 370 as to a respective distance associated with the present location of the responding key fobs 141, 143, 146, and 310. As described with respect to FIG. 2, the responsive messages may indicate, within a reasonable degree of probability, that the responsive messages are from authentic key fobs associated with the vehicle 105.

However, to be sure any one or more of the responsive messages are not spoofed by a relay attack device such as the device of FIG. 2, the ToF security controller 370 may determine a key fob characteristic associated with at least one of the key fobs sending the responsive message (e.g., one or more of the responding key fobs 141, 143, 146, and 310). In one aspect, the ToF controller 370 may select, based on a key fob characteristic, a key fob to act as a time-of-flight (ToF) evaluation module. The ToF evaluation module, as described herein, may be a key fob that is selected to perform (or be used in execution of) a ToF evaluation protocol that evaluates the time taken to send a message, and receive a responsive message in return. The ToF is affected directly by the distance between the vehicle 105 and the selected ToF evaluation module. For example, if the module is physically near the vehicle 105, such as the key fob 310, the ToF would be shorter than the ToF of a key fob at a distance from the vehicle 105 that exceeds the operative distance 207. Responsive to determining that the ToF evaluation module returns a response message with a valid time of flight, and that the ToF controller 370 has responded to the ToF evaluation message(s) within tolerable time limits given the estimated distance of that key fob from the vehicle 105, the ToF controller 370 may unlock the vehicle 105. For example, responsive to determining that the ToF evaluation module returns a valid time of flight message, the ToF controller 370 may transmit, to the BCM 195 (shown in FIG. 1) a command message configured to cause the BCM to perform a key-on operation.

There are various characteristics that may be used to determine which of the key fobs within the operative distance 207 are to be selected as the ToF evaluation module. Although using all of the key fobs 141, 143, 146, and 310 in turn to perform the ToF evaluation, may present a highly secure system, the delay associated with checking all the modules may be untenable, resulting in a delay between touching the door handle 315 and the lock mechanisms unlocking or unlatching the doors (e.g., the door 320). Accordingly, the ToF controller 370 may use distinct characteristics associated with the various key fobs to select a single fob to perform the ToF determination.

In one aspect, the characteristic may include a Received Signal Strength Indication (RSSI) value that indicates a respective key fob's distance from the vehicle 105. In an embodiment, determining a weakest RSSI value based on the first RSSI value and the second RSSI value, and select a key fob having the weakest RSSI value to act as the ToF evaluation module. In the example of FIG. 3, and by this selection criteria, the weakest RSSI within the operative distance 207, may be the key fob 143, because that key fob is the furthest from the ECUs 117 at the time of returning the response message. Thus, the ToF controller 370 may select the key fob 143 to act as the ToF evaluation module based at least in part on the RSSI.

In another aspect, the characteristic may include determining date information and time information associated with a previous vehicle access for a respective key fob. For example, the ToF controller 370 may retrieve date information and time information associated with previous accesses for the responding key fobs, and select one of the key fobs 141, 143, 146, and 310 to act as the ToF evaluation module based on its stored date and time information. In one example embodiment, the ToF controller 370 may receive data from one or more databases from the key-on event data 171 (shown in FIG. 1), which may include the date and time information, and store the data in one or more databases in a computer memory (e.g., the memory 155 as shown in FIG. 1). Selecting the key fob to act as the ToF evaluation module based on the date and time information may include determining the key fob that accessed the vehicle 105 most recently, the greatest number of times within a time range, a least number of times given a time range, etc.

The ToF controller 370 may select the key fob to be the evaluation module using other criteria, such as based on a setting made and stored in the ToF controller 370 during a setup operation. For example, the setup operation may include selecting a ToF evaluation module criteria to use when multiple authorized key fobs are within the operative distance 207 of the vehicle 105.

In yet another example embodiment, the ToF controller 370 may include an analytical engine configured to select the evaluation module of the available key fobs 141, 143, 146, and 310, based on date and time information associated with a plurality of prior key-on event requests by the first key fob and the second key fob. For example, the analytical engine may determine that a key fob is likely to access the vehicle on certain days of the week, during certain times of the day, or according to another repeating pattern. Accordingly, the ToF controller 370 may predict, based at least in part, on the key-on event data 171, that a particular key fob is likely to access the vehicle 105 on a date and time that corresponds to a present date and time. The ToF controller 370 may select that key fob to act as the ToF evaluation module.

Once selected, the ToF evaluation module may perform a series of ToF determinations that may include receiving a test impulse and returning an impulse response. A response time associated with each of the ToF determinations in the series may be evaluated as a response average, which may then be compared to a threshold value for an acceptable response time given the distance calculated based on signal strength. In one example embodiment, a threshold value may be plus or minus three percent, five percent, etc. of the expected time.

FIG. 4 illustrates a block diagram of an exemplary computing environment 400, which may include a computing system 401 for use in practicing the embodiments described herein. The environment and system described herein can be implemented in hardware, software (e.g., firmware), or a combination thereof. The computing system 401 may be representative of one or more of the computing systems depicted with respect to FIGS. 1, 2, and 3. For example, the computing system 401 may be substantially similar or identical to the automotive computer 145, and/or the ECUs 117 as shown with respect to FIGS. 1-3.

With reference to the computing system 401 in FIG. 4, the computing system 401 may include one or more processor(s) 405, a memory 410 communicatively coupled to the one or more processor(s) 405, and one or more input/output adaptors 415 that can communicatively connect with external devices such as, for example, input devices 445 and/or output devices 450. The computing system 401 may operatively connect to and communicate information with one or more internal and/or external memory devices such as, for example, one or more databases via a storage interface 420. The computing system 401 may also include one or more network adaptor(s) 425 enabled to communicatively connect the computing system 401 with one or more network(s) 125. In one embodiment, the computing system 401 can include one or more telecommunications network(s) for communication between the computing system 400 and any external device. In such embodiments, the computing system 401 can further include one or more telecommunications adaptor(s) 440.

The one or more processor(s) 405 are collectively a hardware device for executing program instructions (aka software), stored in a computer-readable memory (e.g., the memory 410). The one or more processor(s) 405 can be a custom made or commercially-available processor, a central processing unit (CPU), a plurality of CPUs, an auxiliary processor among several other processors associated with the computing system 401, a semiconductor-based microprocessor (in the form of a microchip or chip set), or generally any device for executing instructions.

The one or more processor(s) 405 may be disposed in communication with one or more memory devices (e.g., the memory 410 and/or one or more external databases 430, etc.) via a storage interface 420. The storage interface 420 can also connect to one or more memory devices including, without limitation, one or more databases 430, and/or one or more other memory drives (not shown in FIG. 4) including, for example, a removable disc drive, a vehicle computing system memory, cloud storage, etc., employing connection protocols such as serial advanced technology attachment (SATA), integrated drive electronics (IDE), universal serial bus (USB), fiber channel, small computer systems interface (SCSI), etc.

The memory 410 can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The instructions in the memory 410 can include one or more separate programs, each of which can include an ordered listing of computer-executable instructions for implementing logical functions. In the example of FIG. 4, the instructions in the memory 410 can include an operating system 455. The operating system 455 can control the execution of other computer programs such as, for example the ToF security controller 370, and provide scheduling, input-output control, file and data management, memory management, and communication control and related services.

The program instructions stored in the memory 410 can further include application data 460, and instructions for controlling and/or interacting with the computer through a user interface 465.

The I/O adaptor 415 can connect a plurality of input devices 445 to the computing system 401. The input devices can include, for example, a keyboard, a mouse, a microphone, a sensor, etc. The input device(s) 445 may also include one or more virtual keyboard(s) on a touchscreen interface, or another conventional input device.

The I/O adaptor 415 can also connect a plurality of output device(s) 450, which can include, for example, a display, a speaker, a touchscreen, etc. The output device(s) 450 may include one or more display adaptor(s) coupled to one or more display(s) (not shown in FIG. 4). The output devices 450 can include but are not limited to a printer, a scanner, an alarm system, a light, etc. Other output devices can also be included, although not shown.

Finally, the I/O devices 445 and 450 that may be connectable to the I/O adaptor 415 can further include devices that communicate both inputs and outputs, for instance but are not limited to, a network interface card (NIC) or modulator/demodulator (for accessing other files, devices, systems, or a network), a radio frequency (RF) or other transceiver, a Near Field Communication (NFC) device, a Bluetooth® Low energy receiver, an ad-hoc networking device, a bridge, a router, etc.

According to some example embodiments, the computing system 401 can include one or more telecommunications adaptor(s) 440 that may be disposed in communication with mobile telecommunications infrastructure such as, for example, mobile phone towers, satellites, vehicle-to-vehicle network infrastructure, etc. The telecommunications adaptor(s) 440 can also include and/or be disposed in communication with or more other adaptors configured to transmit and/or receive cellular, mobile, and/or other communications protocols for wireless communication. The telecommunications adaptor(s) 440 can also include and/or be disposed in communication with a global positioning system (GPS) receiver 175 (as shown in FIG. 1).

In some embodiments, the telecommunications adaptor(s) 440 may couple the computing system 401 to one or more network(s) 435. The network(s) 435 may be and or include the Internet, a private network, public network or other configuration that operates using any one or more known communication protocols such as, for example, transmission control protocol/Internet protocol (TCP/IP), Bluetooth®, Wi-Fi, and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples. The network(s) 435 can also be and/or include a packet-switched network such as a local area network, wide area network, metropolitan area network, the Internet, or other similar type of network environment.

The network(s) 435 can operatively connect the computing system 401 to one or more devices including, for example, one or more server(s) 470. The server(s) 470 may be substantially similar or identical to the server(s) 170 depicted with respect to FIG. 1.

The computing system 401 may connect with one or more key fobs 480, which may be, for example, the key fobs described with respect to FIGS. 1-3. Example key fobs may include a smart watch, a smart phone, a conventional key fob, smart glasses or other wearable technology, etc. Other possible configurations for key fobs are possible, and such configuration are contemplated.

Figure 5:
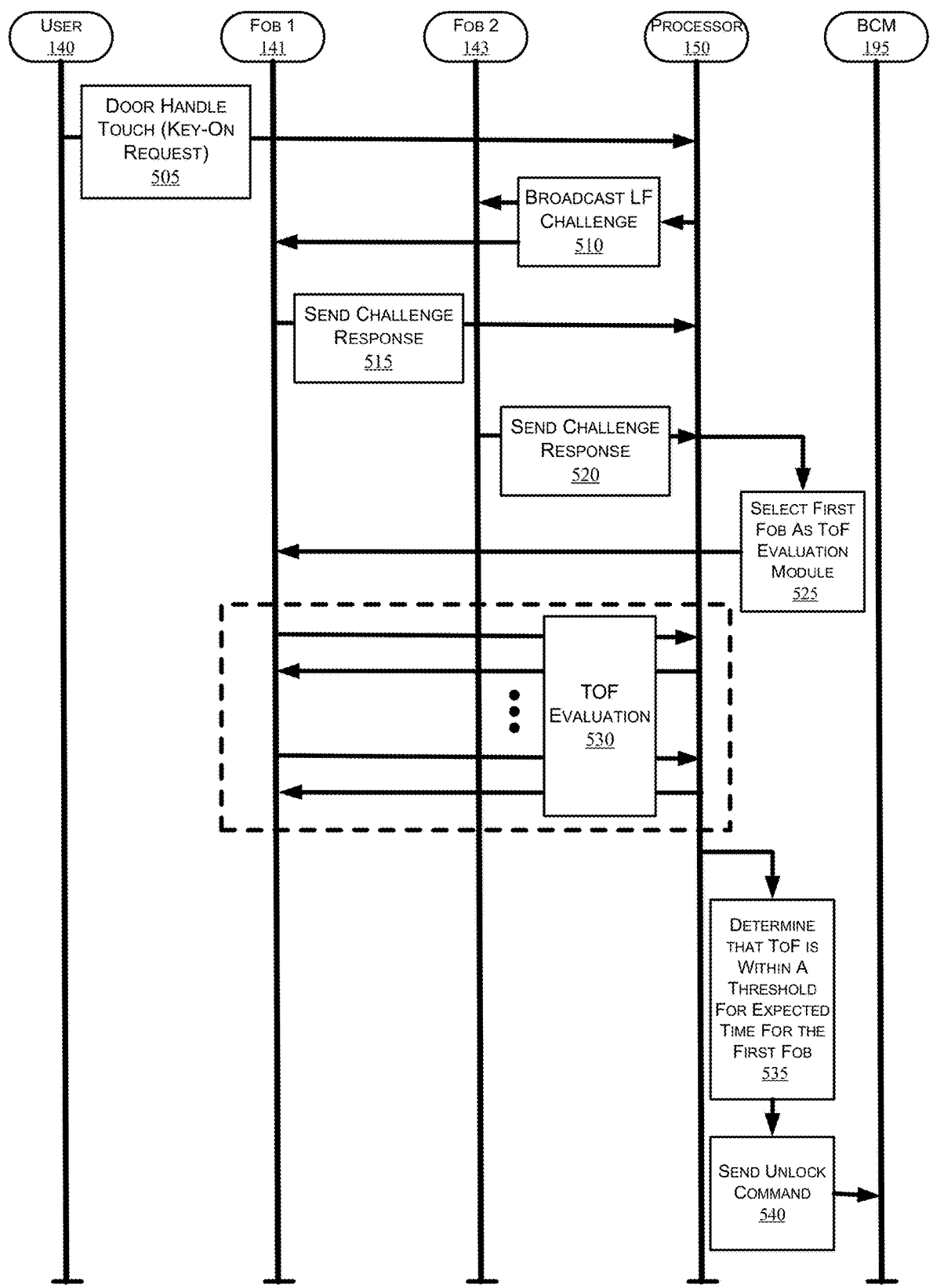
FIG. 5 depicts a system flow diagram in accordance with the present disclosure.

FIG. 5 depicts a system flow diagram in accordance with the present disclosure. A wake-up trigger request may be initiated when a user (e.g., the user 140) touches a door handle, or performs another action that triggers an unlock procedure. The processor 150 may receive the request 505 responsive to the door handle touch, and broadcast a low-frequency (LF) challenge message 510 to all key fobs within the operative distance from the vehicle 105. In the example of FIG. 5, the key fob 141 (used by the user 140) may be in range, and a second key fob (key fob 143) may also be in range. For example, two family members that both hold an authorized key fob in their pockets, respectively, may approach the vehicle at the same time. For the sake of simplicity, only two key fobs are described in this example. It should be appreciated, however, that more key fobs may be used with a single vehicle, and such use is contemplated.

The key fobs 141 and 143, after receiving the broadcast LF challenge message 510, may transmit a response 515, and 520, respectively, to the processor 150. After all key fobs within range of the processor 150 have responded, the processor 150 may select the first key fob 141 as the evaluation module 525, and transmit the selection instruction to the key fob 141. The key fob 141, now acting as the evaluation module, may perform a ToF evaluation protocol 530 with the processor 150, which may include a series of send/receive operations that output an average time of flight value for the fob. Responsive to determining that the ToF is within a threshold for expected time for the first fob (at step 535) the processor 150 may send an unlock command 540 to the BCM 195. The BCM 195, after receiving the command, may then trigger an unlock operation.

Figure 6:
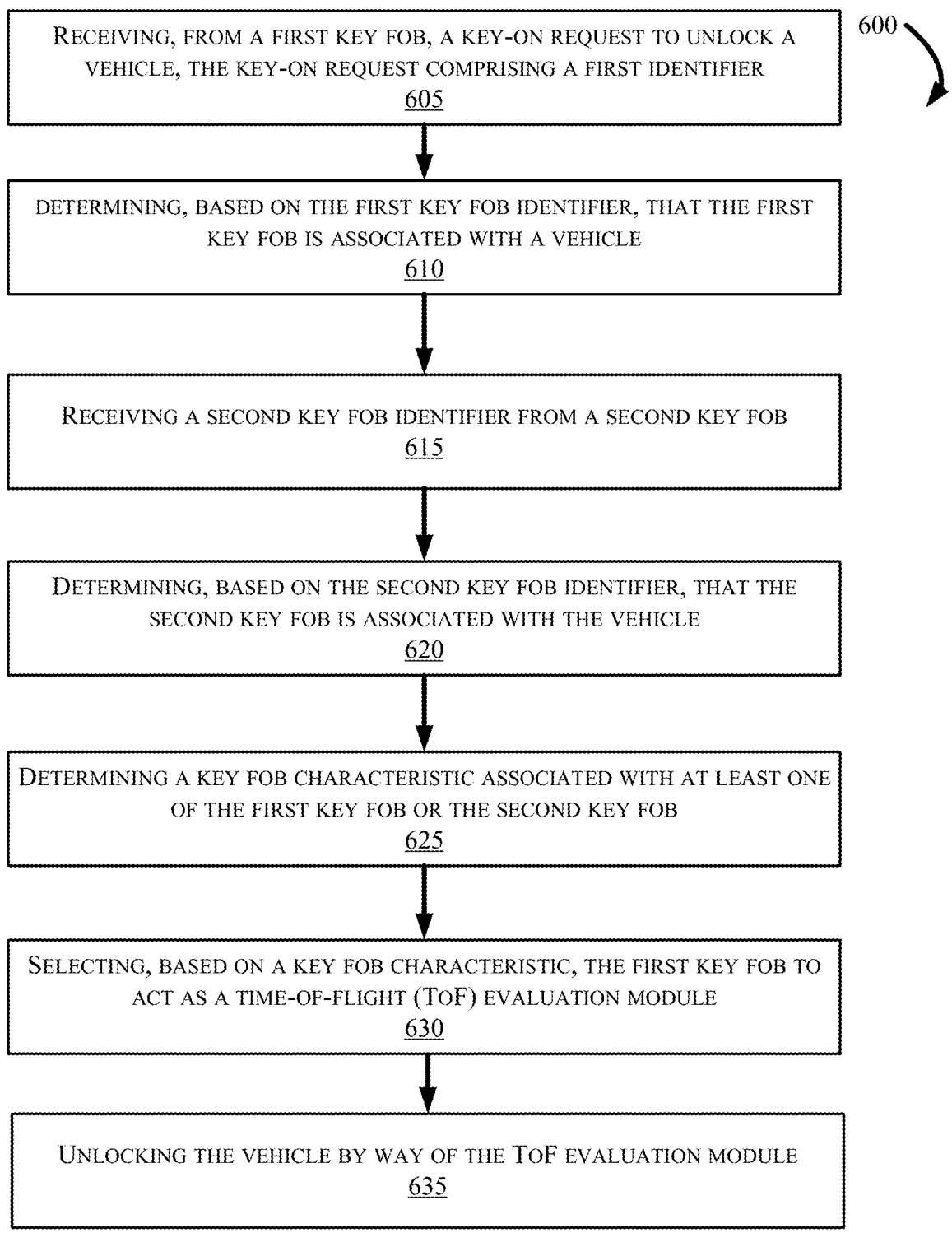
FIG. 6 is a flowchart depicting an example method for unlocking a vehicle based on a time of flight evaluation in accordance with the present disclosure.

FIG. 6 is a flowchart of an example method 600 of the present disclosure. The method generally includes a step 605 of receiving, from a first key fob, a key-on request to unlock a vehicle (for example, the vehicle 105 as shown in FIG. 1), the key-on request comprising a first identifier.

At step 610, the method may include a determining step, where the processor determines, based on the first key fob identifier, that the first key fob is associated with a vehicle. The key fob identifier may include, for example, a unique encoded number that is associated with the vehicle 105.

Next, the method includes a step 615 of receiving a second key fob identifier from a second key fob.

Next, the method includes a step 620 of determining, based on the second key fob identifier, that the second key fob is associated with the vehicle.

At step 625, the processor may determine a key fob characteristic associated with at least one of the first key fob or the second key fob.

At step 630, the processor may then select, based on a key fob characteristic, the first key fob to act as a time-of-flight (ToF) evaluation module. The key fob characteristic may include, for example, a Received Signal Strength Indication (RSSI) value, date information and time information associated with a previous vehicle access for the first key fob, a prior setting saved in the system memory, or a prior pattern of use for a particular key fob. An analytical engine may be configured to determine prior patterns of key fob use, and determine such a characteristic.

At step 635, the processor may unlock the vehicle based on the ToF evaluation performed by the ToF evaluation module. This step may include, for example, sending an unlock command to the BCM to unlock the vehicle doors.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, nonvolatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A computer-implemented method, comprising:
   receiving, from a first key fob, a trigger request comprising a first identifier;
   determining, based on the first identifier, that the first key fob is associated with a vehicle;

receiving a second identifier from a second key fob;
determining, based on the second identifier, that the second key fob is associated with the vehicle;
selecting, after the first identifier is received from the first key fob and the second identifier is received from the second key fob, the first key fob, based on a key fob characteristic, the key fob characteristic comprising historical data associated with a previous authorization of the first key fob to access the vehicle;
determining a time of flight associated with the first key fob; and
unlocking the vehicle based on the time of flight satisfying a threshold.

2. The computer-implemented method according to claim 1, further comprising:
transmitting a first message to the first key fob and a second message to the second key fob;
receiving, from the first key fob, a first response message including the first identifier and a second response message from the second key fob including the second identifier, wherein the first key fob is selected for the time of flight determination instead of the second key fob based on the key fob characteristic; and
sending, to a body control module (BCM), a command message configured to cause the BCM to perform a trigger operation.

3. The computer-implemented method according to claim 1, wherein the key fob characteristic further comprises a Received Signal Strength Indication (RSSI) value.

4. The computer-implemented method according to claim 3, wherein selecting the first key fob comprises:
receiving a first RSSI value for the first key fob; and
wherein selecting the first key fob is based on the first RSSI value.

5. The computer-implemented method according to claim 1, wherein selecting the first key fob comprises:
determining date information and time information associated with a previous vehicle access for the first key fob; and
wherein selecting the first key fob is based on the date information and the time information.

6. The computer-implemented method according to claim 1, wherein selecting the first key fob comprises:
retrieving a first key fob setting; and selecting the first key fob is based on the first key fob setting.

7. The computer-implemented method according to claim 1, wherein the historical data comprises date and time information associated with a prior trigger event request.

8. A system, comprising:
a processor; and
a memory for storing executable instructions, the processor configured to execute the instructions to:
receive, from a first key fob, a trigger request comprising a first identifier;
determine, based on the first identifier, that the first key fob is associated with a vehicle;
receive a second identifier from a second key fob;
determine, based on the second identifier, that the second key fob is associated with the vehicle;
select the first key fob, based on a key fob characteristic associated with the first key fob, wherein selecting the first key fob is performed after the first identifier is received from the first key fob and the second identifier is received from the second key fob;
determine a time of flight associated with the first key fob; and
unlock the vehicle based on a time of flight satisfying a threshold.

9. The system according to claim 8, wherein the processor is further configured to execute the instructions to:
transmit a message to the first key fob;
receive, from the first key fob, a response message;
determine that the time of flight associated with the response message satisfies the threshold; and send, to a body control module (BCM), a command message configured to cause the BCM to perform a trigger operation.

10. The system according to claim 8, wherein the key fob characteristic comprises a Received Signal Strength Indication (RSSI).

11. The system according to claim 10, wherein the processor is further configured to execute the instructions to:
receive a first RSSI value for the first key fob; and
wherein to select the first key fob is based on the first RSSI value.

12. The system according to claim 8, wherein the processor is further configured to execute the instructions to:
determine date information and time information associated with a previous vehicle access for the first key fob; and
wherein to select the first key fob is based on the date information and the time information.

13. The system according to claim 8, wherein the processor is further configured to execute the instructions to:
retrieve a first key fob setting; and
wherein to select the first key fob is based on the first key fob setting.

14. The system according to claim 9, wherein to select the first key fob is based on date and time information associated with a prior trigger event request.

15. A Bluetooth® Low Energy (BLE) module having instructions stored thereupon which, when executed by a processor, cause the processor to:
transmit a first message to a first key fob and a second message to a second key fob;
receive, from a first key fob, a trigger request comprising a first identifier;
determine, based on the first identifier, that the first key fob is associated with a vehicle;
receive a second identifier from a second key fob;
determine, based on the second identifier, that the second key fob is associated with the vehicle;
determine a time of flight associated with the first key fob instead of the second key fob based on the key fob characteristic, the key fob characteristic comprising historical data associated with a previous authorization of the first key fob to access the vehicle;
send, to a body control module (BCM), a command message configured to cause the BCM to perform a trigger operation; and
unlock the vehicle based on the time of flight satisfying a threshold.

16. The BLE module according to claim 15, having further instructions stored thereupon to:
transmit a message to the first key fob;
receive a response message from the first key fob;
determine that the time of flight associated with the response message satisfies the threshold; and
transmit, to a body control module (BCM), a command message configured to cause the BCM to perform a trigger operation.

17. The BLE module according to claim 15, having further instructions stored thereupon to:
  receive a first Received Signal Strength Indication (RSSI) value for the first key fob; and
  wherein to select the first key fob is based on the first RSSI value.

18. The BLE module according to claim 15, wherein the processor is further configured to execute the instructions to:
  determine date information and time information associated with a previous vehicle access for the first key fob; and
  wherein to select the first key fob is based on the date information and the time information.

19. The BLE module according to claim 15, wherein the processor is further configured to execute the instructions to:
  retrieve a first key fob setting; and
  wherein to select the first key fob is based on the first key fob setting.

20. The BLE module according to claim 15, wherein to select the first key fob is based on date and time information associated with a prior trigger event request by the first key fob.

* * * * *